United States Patent [19]

Sheesley et al.

[11] 3,797,324
[45] Mar. 19, 1974

[54] ACTUATOR

[75] Inventors: John M. Sheesley, Houston; Ronald A. Gulick, Sugarland, both of Tex.

[73] Assignee: Research Engineering Company, Houston, Tex.

[22] Filed: July 31, 1972

[21] Appl. No.: 276,327

[52] U.S. Cl. ............................ 74/99, 92/138
[51] Int. Cl. ............................ F16h 21/44
[58] Field of Search ........ 74/99, 89.15; 92/138, 5 R

[56] References Cited
UNITED STATES PATENTS

| | | | |
|---|---|---|---|
| 3,385,120 | 5/1968 | Nott | 74/89.15 |
| 3,027,095 | 3/1962 | Paasche | 74/99 |
| 2,771,845 | 11/1956 | Eagan | 92/138 |
| 3,298,466 | 1/1967 | Ayers, Jr. et al. | 92/5 R |
| 3,359,869 | 12/1967 | Avera | 92/5 R |
| 2,928,375 | 3/1960 | Herrmann | 92/138 |
| 3,493,233 | 2/1970 | Foufounis | 74/89.15 |
| 3,572,140 | 3/1971 | Gulick | 74/89.15 |

Primary Examiner—Benjamin W. Wyche
Assistant Examiner—Wesley S. Ratliff, Jr.

[57] ABSTRACT

A valve actuator wherein the actuator housing structure includes reinforcing means such as rods capable of resisting forces exerted thereagainst by a force transmission device, such as a yoke and roller.

10 Claims, 7 Drawing Figures

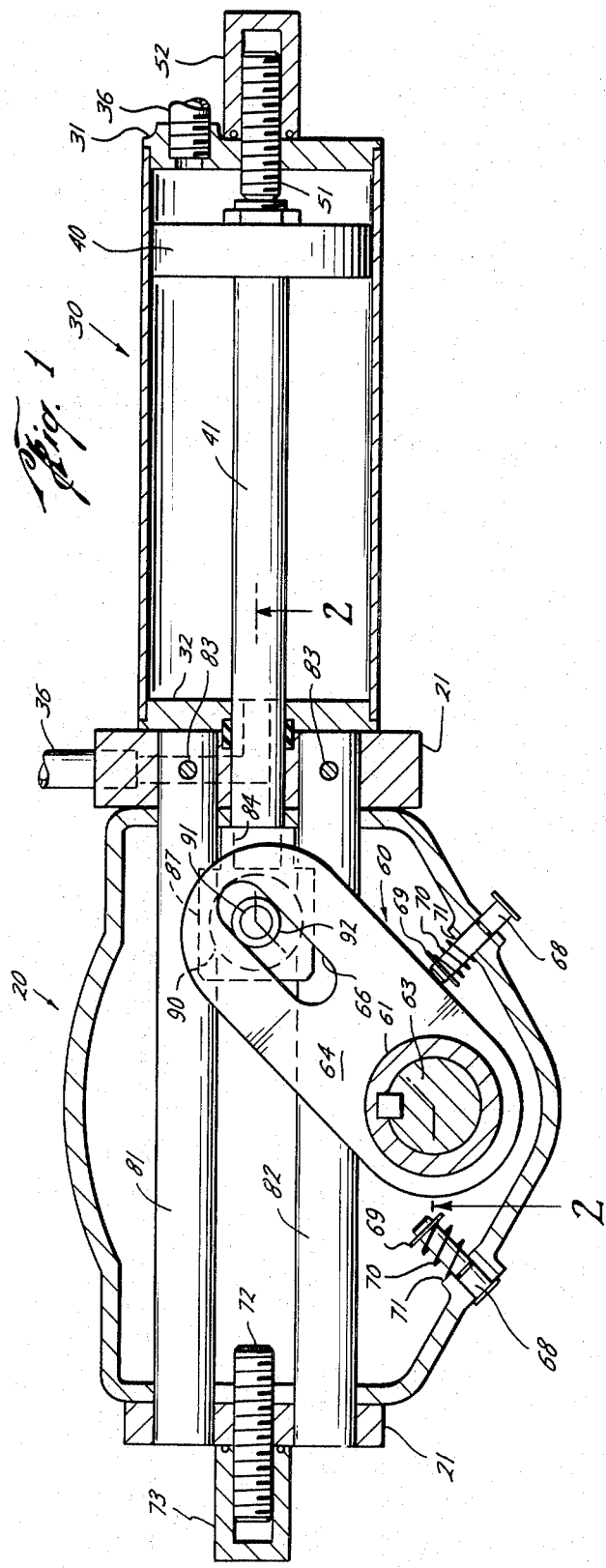
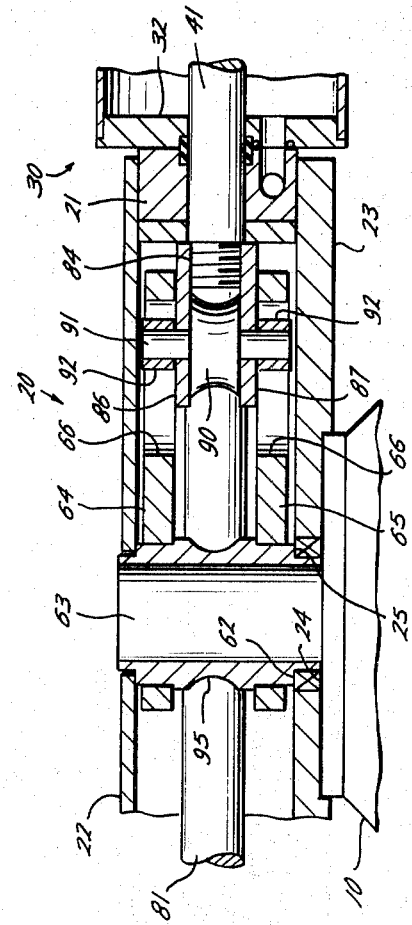
Fig. 1
Fig. 2

ACTUATOR

BACKGROUND OF THE INVENTION

Actuators of this type have long been used to open and close valves of different types. Such actuators have been manually, hydraulically and electrically controlled. Within the more recent past, yoke mechanisms have been utilized to convert longitudinal movement, of a piston for example, into rotary or oscillatory movement of the yoke, and thereby of an attached valve stem. A particular problem has involved the necessity of handling thrust, side-load and moments of force that are generated. This invention has sought to provide the required force absorbing features within the actuator housing.

SUMMARY OF THE INVENTION

The overall operation of this actuator may be much like the operation of that device described in U.S. application Ser. No. 096,461, filed Dec. 9, 1970, now U.S. Pat. No. 3,704,986. In this or similar actuators, various kinds of extraneous forces can be used to impart longitudinal movement to a member, such as to a piston rod. This movement is then translated into rotary or oscillatory movement of a yoke-type device. The yoke, being attached in some manner to a valve stem, causes rotation of the valve stem, and thereby opening or closing the valve. The type of extraneous power supply, including piston cylinders per se, may be varied, since the essence of this invention relates to housing structure. Within the central housing, spaced rod members extending through the housing, serve both as guides for a movable, yoke-related, device, as well as force absorbing means. This permits such forces to be absorbed within the housing rather than by or within the power cylinder.

DESCRIPTION OF THE DRAWINGS

FIG. 1 is a partial vertical section through the central actuator housing and adjacent cylinder;

FIG. 2 is taken along lines 2—2 of FIG. 1;

DESCRIPTION OF A PREFERRED EMBODIMENT

Figure 3:
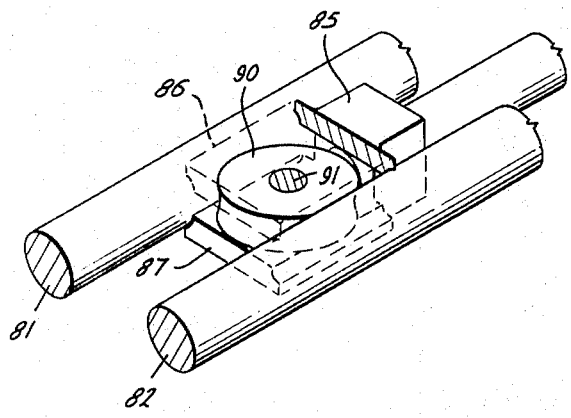
FIG. 3 is a detail of one type of connection between the piston rod and follower, utilizing cylindrical guide rods.

A portion of a valve, to be controlled, is indicated at 10, with this actuator fixed thereon. The actuator itself is depicted as having a central housing portion 20, and an attached power cylinder 30. It should first be stated that the number of such power cylinders may certainly be varied, as well as the particular type of motive power, and still be contemplated by this invention. For purposes of illustration, with the exception of FIG. 5, only a single pneumatically or hydraulically operated power cylinder is shown. Also a double yoke may be used, i.e., having arms extending oppositely from the hub, such simply resulting in a duplication of the structure hereinafter described.

Cylinder 30 contains an axially movable piston 40, which is secured to one end of a piston rod 41. Movement of said piston and rod in one direction may be limited by stop 51, which stop may be adjustably engaged with nipple extension 52, the latter member being fixed to cylinder cover 31. The other end of rod 41 extends through cylinder head 32. This cylinder head may be joined to block 21 of housing 20 by fasteners (not shown), welding, mating threads, or the like. Pneumatic or hydraulic passageways are shown through cover 31, as well as through block 21, and head 32, they being fitted to tubing 36 connected to an outside power source for controlling piston movement in a conventional manner.

The central housing 20, includes upper and lower cover plates 22, and 23, as well as the aforementioned end blocks 21, such end blocks obviously being an integral portion of the housing. Both cover plates may be apertured to receive opposite ends of hub 61 of yoke mechanism 60, or one may be solid, as hereinafter described. Bushing 24, fitted within the lower cover plate opening, includes a shoulder 25 which serves as a bearing surface for cooperating shoulder 62 of hub 61. Here it may be noted that the invention hereinafter described provides sufficient force absorbing strength to the housing, as to permit provision of only a single bearing, i.e., rather than one at each cover as would be conventional prior to this invention. FIG. 1 illustrates a valve stem 63 to be keyed to hub 61. The yoke includes upper and lower arms, 64,65, each arm being slotted, as at 66 for receipt of a driving pin. This slot may be axially oriented as shown, arcuate or canted.

Toward the housing end adjacent yoke hub 61, a pair of yoke position indicators, 67,68 extend through the housing wall. The indicators may include a lug or flange 69, and a spring 70 positioned between such lug and shoulder 71 of the housing. When one of the yoke arms engages such stop, its head portion will be urged outside the housing to a position different from that in the absence of such engagement.

Thus, the piston of members 67,68 will provide a visual indication of the position of the yoke, and thereby of the valve condition. Pistons or plungers 68, may be used to activate switches, valves or the like. While a plurality of power cylinders may be provided, or the other power arrangements, only a single one is illustrated, for ease of presentation. Thus, a simple stop mechanism 72,73 is provided toward the left of FIG. 1, acting much like members 51,52 i.e., acting as a stp for a traveling member.

Extending across the housing, and fixed to opposite sides thereof, such as to blocks 21, are rods or struts 81 and 82. These rods would be fixed to the housing, such as by pins 83, such connections only being shown on one side. The configuration of the rods in the embodiment of FIGS. 1 and 2 is cylindrical with an annular cross section. The yoke arms are movably positioned on the opposite sides of such rods.

Moving along and intermediate rods 81 and 82 is a traveling member linked to a piston rod 41. In the embodiment of FIGS. 1, 2 and 3, such linkage takes the form of threadedly engaging one end 84 of piston rod 41 with block 85 which has bifurcated legs 86 and 87. Roller 90 is rotatably positioned astride pin 91, which in turn is carried by and has its ends extending through legs 86 and 87 of block 85. Roller 90, in this embodiment, has a concave outer surface, for engaging rounds 81,82. The opposite ends of pin 91 each carry smaller rollers of slides 92, which are so positioned as to engage the respective slots 66 in yoke arms 64 and 65.

In the operation of this embodiment, the piston and rod would be caused to move longitudinally, by some extrensic force. Inasmuch as one end of the piston rod is connected to traveling blocks 85, it too, and its related structure, reciprocates. The roller 90, carried by pin 91, rides between and is guided by rods 81 and 82. As this roller 90 moves, it, through pin 91, carries along yoke rollers 92. They, in turn, cause the yoke to oscillate, i.e., move arcuately, by virtue of their being positioned within the yoke arm slots. The advantages of these particular features stem from rods 81,82 being fixed to the housing, and the yoke carrying member, in this case roller 90 moving adjacent such rods. By virtue of this configuration, forces that are generated, regardless of the direction of yoke movement, may be absorbed within the actuator housing, rather than within the cylinder body. Not only would the thrust reaction to the extrensic force be absorbed by rods 81,82 but also side loads produced by the yoke will be transmitted by roller 90 to one of such rods, depending on the direction of movement of the yoke. It may be here noted that provision may be made for some flexure of rod 82 by providing an arcuate cut out 95 in the central periphery of yoke hub 61. This feature would permit the rod to have some play, at the expense of efficiency, at both the start and finish of the torque curve.

Figure 4:
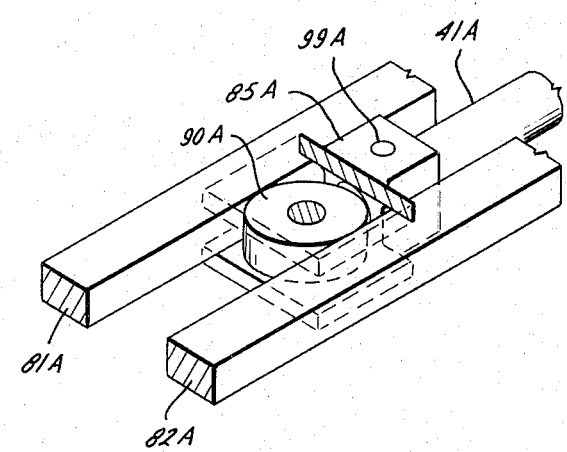
FIG. 4 illustrates a modified connection and guide rod configuration.
Figure 5:
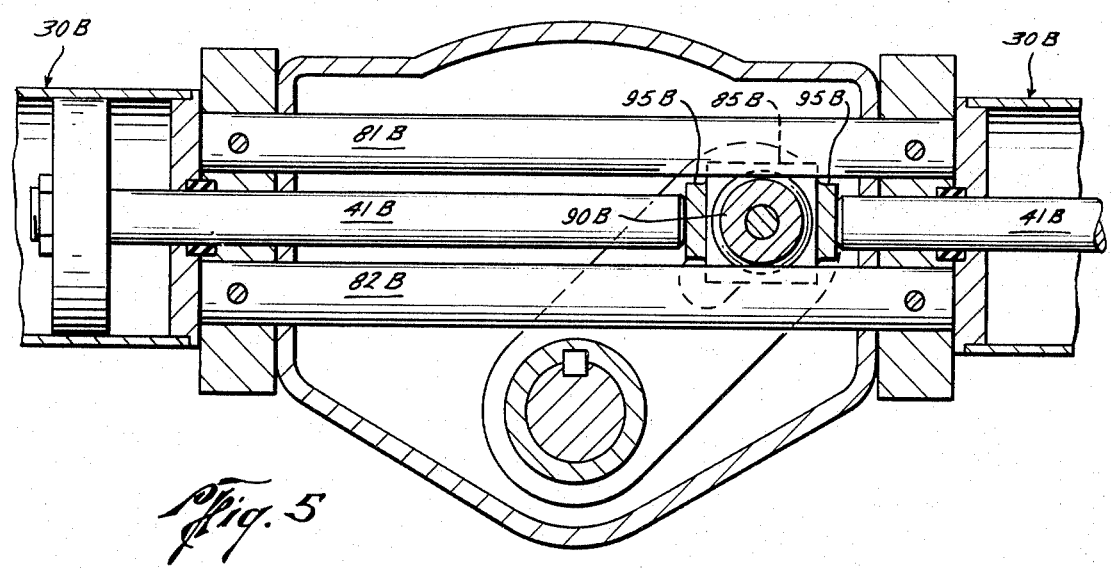
FIG. 5, similar to FIG. 1, depicts a modified dual piston rod arrangement.

Not only may such force absorbtion be desirably transferred to the housing, but other attributes are possible. For example, supporting members such as rods 81,82 may be separately fabricated, or may be integrally molded or fashioned as a part of the housing. The modification of FIG. 4 illustrates the point that the rods 81A and 82A may have rectangular shapes, i.e., other than round, and that roller 90A may have a smooth outer surface, i.e., other than concave (in some instances a convex outer configuration might be useful). This figure also illustrates a pivotal connection, at 99A, between the piston rod 41A and the roller-holding, traveling block 85 A. Such movement permits some lateral movement of roller 90A, without developing side loads on the piston rod. Such pivotal connection may include an elongated slot (not shown) in either or both of the piston rod and traveling block. FIG. 5 illustrates the point that in some embodiments, the traveling block 85 B may be independent of any direct connection to a piston rod. In this embodiment, the roller 90B, as in the previous instances, runs between rods 81B and 82B, each fixed to the housing. Here, a pair of oppositely disposed power cylinders 30B are shown, each including a piston and piston rod. Each piston rod, designated 41B may impinge on lug portions 95B of the traveling member 85B. In other respects, the operation is the same as that described previously.

Figure 6:
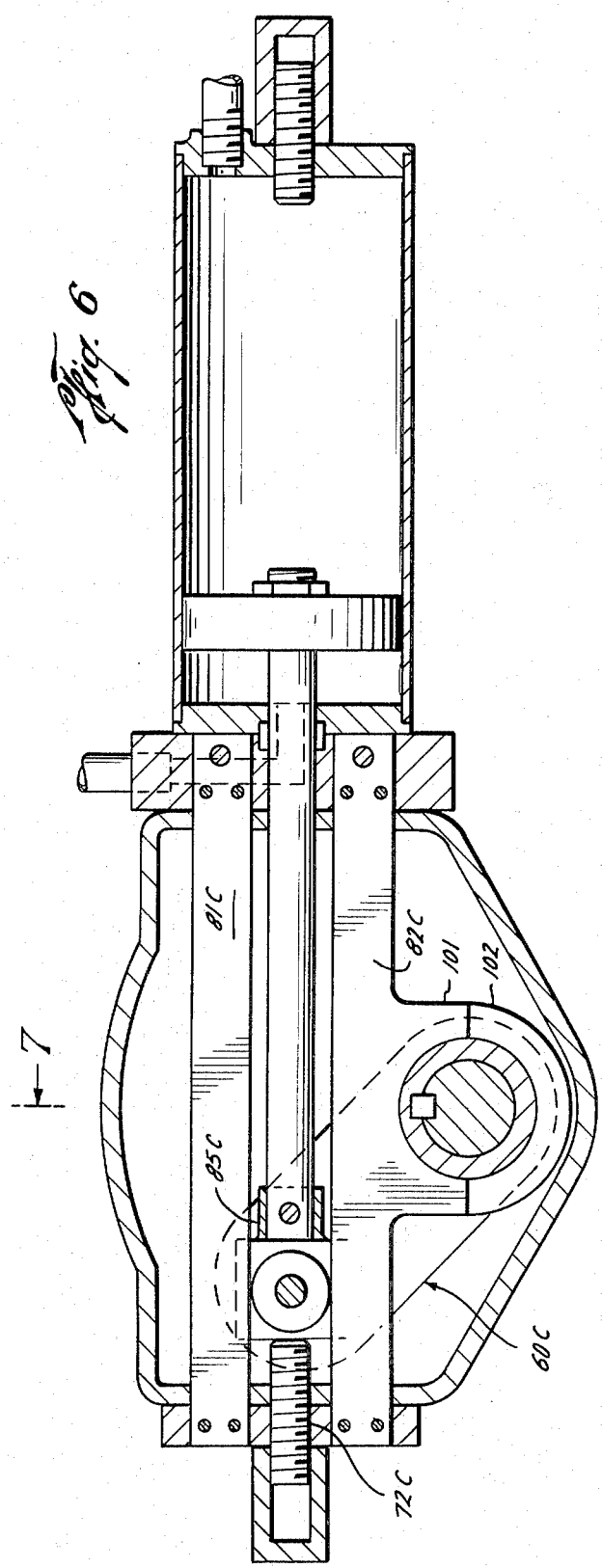
FIG. 6 is a section similar to FIG. 1, but showing the yoke rotated 90° and depicting modified support bars.
Figure 7:
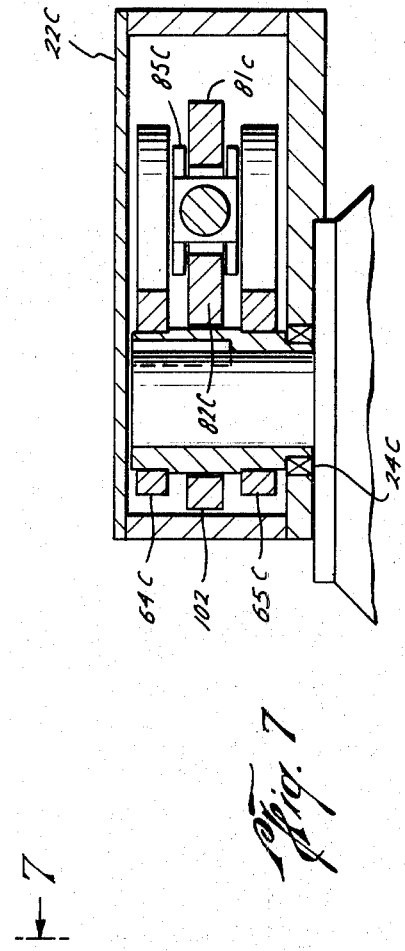
FIG. 7 is a section taken along lines 7—7 of FIG. 6.

FIGS. 6 and 7, similar to FIG. 1, illustrates a modification, illustrative of the possible permutations of this invention. Yoke 60C is in a position opposite to that of FIG. 1, with stop 72C blocking further movement of traveling block 85C, which carries roller 90C moving between rods 81C and 82C which are fixed to the housing. The drawing illustrates that a lug extension 101 of one of the support rods as a partial bearing or support for the yoke hub.

Here, such a lug joins a counterpart partial bearing or support 102, which may be fabricated as an integral part of the base or cover to the housing. Obviously, such a lug extension of one of the rods would permit ease of assembly, could result in decreased fabrication costs, and may be axially positioned as shown in FIG. 7, or may form the bearing 24C shown therein. In the latter regard, it was determined during the design of this invention, that whereas prior yoke devices normally included bearings for the yoke hubs at more than one housing location, i.e., usually in the housing base and cover. Inasmuch as the valve usually provides a bearing for its stem, the provision of a plurality of housing-bearings for the stem-keyed yoke hub could result in binding or actual lockage. Thus it was determined for most applications that side load, and substantially all bending moments could be absorbed with only a single bearing, such as shown at the bottom of FIGS. 2 and 7.

Numerous other modifications of the invention would be possible by one skilled in the art without departing from the spirit of the invention, the scope of which is intended to be limited only by the following claims:

We claim:

1. A valve actuator including means for transmitting motive force to a movable member, said movable member being at least partially positioned within a housing, and including means for linking the said movable member to a portion of a valve;

a pair of elongated tracks integral with said housing;

said movble member being an oscillatable yoke having a pair of arms, said arms being oscillatable on opposite sides of said tracks, and each arm having an elongated slot therein;

said transmission means including a traveling member having a portion movably engageable with said tracks whereby forces generated against said traveling member in a direction perpendicular to its direction of travel are transmitted to said tracks, said traveling member including a roller engageable with said tracks; and means for translating motion of said traveling member into movement of said movable member, said motion translating means including a pin having portions engageable with said slots.

2. The device of claim 1 wherein said tracks are circular in cross sectional area.

3. The device of claim 2 wherein said roller is concave at its periphery.

4. The device of claim 1 wherein said movable member includes a cutaway portion correlative in configuration with a portion of one of said tracks, to accommodate flexure thereof.

5. The device of claim 1 wherein said tracks are non circular in cross sectional area.

6. The device of claim 1 wherein said transmission means further includes a piston rod, said rod being pivotally engageable with said traveling member.

7. The device of claim 1 wherein said transmission means further includes a pair of piston rods each being at least partially positioned within oppositely disposed power cylinders and engageable with said traveling member.

8. The actuator of claim 1 wherein said yoke has a hub portion, and at least one of said tracks includes a first lug portion, said housing includes a further lug portion, said lug portions being mating to provide an annular support for said yoke hub.

9. The actuator of claim 1 wherein said housing includes a spaced pair of said indicator devices, each of which includes a spring-biased plunger for indicating the extreme positions as well as an intermediate position of said oscillatable member.

10. In an actuator having an oscillatable yoke member having a hub positioned in a housing, means for oscillating said member, and means linking said member to a valve stem, the improvement comprising;

a single annular bearing provided the bottom cover of said housing for supporting one end of said yoke within said housing, the other end of said yoke hub being free of restraint by said housing.

* * * * *

UNITED STATES PATENT OFFICE
CERTIFICATE OF CORRECTION

Patent No. 3,797,324　　　　　　　　Dated March 19, 1974

Inventor(s) John M. Sheesley

It is certified that error appears in the above-identified patent and that said Letters Patent are hereby corrected as shown below:

Claim 1, line 7, "movble" should read -- movable --.

Claim 9, line 2, before "indicator" cancel "said".

Signed and sealed this 24th day of September 1974.

(SEAL)
Attest:

McCOY M. GIBSON JR.　　　　　　　C. MARSHALL DANN
Attesting Officer　　　　　　　　Commissioner of Patents